(12) United States Patent
Zhang et al.

(10) Patent No.: US 11,408,156 B2
(45) Date of Patent: Aug. 9, 2022

(54) TWO-HANDLE FAUCET

(71) Applicant: Xiamen Forbetter Sanitary Ware Co., Ltd., Fujian (CN)

(72) Inventors: Xingui Zhang, Xiamen (CN); Qiang Chen, Xiamen (CN); Mouyong Lin, Xiamen (CN)

(73) Assignee: XIAMEN FORBETTER SANITARY WARE CO., LTD., Fujian (CN)

(*) Notice: Subject to any disclaimer, the term of this patent is extended or adjusted under 35 U.S.C. 154(b) by 43 days.

(21) Appl. No.: 17/006,916

(22) Filed: Aug. 31, 2020

(65) Prior Publication Data

US 2021/0340743 A1 Nov. 4, 2021

(30) Foreign Application Priority Data

Apr. 30, 2020 (CN) .......................... 202010365222.9

(51) Int. Cl.
*E03C 1/04* (2006.01)
*F16K 31/60* (2006.01)
*F16K 5/02* (2006.01)
*F16K 11/22* (2006.01)

(52) U.S. Cl.
CPC .......... *E03C 1/0403* (2013.01); *E03C 1/0402* (2013.01); *F16K 5/0214* (2013.01); *F16K 31/60* (2013.01); *F16K 11/22* (2013.01)

(58) Field of Classification Search
CPC ........ F16K 5/0214; F16K 31/60; F16K 11/22; E03C 1/0404; E03C 1/0402
USPC ......................................................... 137/801
See application file for complete search history.

(56) References Cited

U.S. PATENT DOCUMENTS

| | | | | |
|---|---|---|---|---|
| 7,404,413 | B2* | 7/2008 | Chang | E03C 1/04 137/359 |
| 8,302,620 | B2* | 11/2012 | Lin | E03C 1/04 137/315.12 |
| 9,428,891 | B2* | 8/2016 | Tzeng | E03C 1/04 |
| 2006/0200904 | A1* | 9/2006 | Vogel | E03C 1/0402 4/695 |
| 2008/0196776 | A1* | 8/2008 | Ko | E03C 1/04 137/603 |
| 2010/0032943 | A1* | 2/2010 | Li | E03C 1/0403 285/122.1 |
| 2011/0073205 | A1* | 3/2011 | Marty | E03C 1/0404 137/801 |
| 2012/0067978 | A1* | 3/2012 | Leichty | E03C 1/0401 239/417.5 |
| 2013/0020794 | A1* | 1/2013 | Stokes | E03C 1/0403 285/8 |
| 2016/0333554 | A1* | 11/2016 | Fry | E03C 1/0403 |

* cited by examiner

*Primary Examiner* — Patrick C Williams
(74) *Attorney, Agent, or Firm* — Leong C. Lei

(57) ABSTRACT

A two-handle faucet includes a faucet body, a faucet housing, and a faucet base. The faucet body includes two valve core assemblies, a tee connector, a water outlet pipe, and two water inlet pipes. The water inlet pipes are insertedly connected to the faucet base. The water outlet pipe is hermetically connected to the tee connector. The water inlet pipes are connected to the tee connector through the two valve core assemblies. The valve core assemblies are responsible for the passing of water. The faucet base is only used for supporting the faucet, and the water won't pass through the faucet base. The faucet is safe for use and has sufficient strength, so that the product performance is stable and the cost can be reduced.

13 Claims, 5 Drawing Sheets

TWO-HANDLE FAUCET

BACKGROUND OF THE INVENTION

1. Field of the Invention

The present invention relates to a faucet, and more particularly to a two-handle faucet that can be assembles easily.

2. Description of the Prior Art

A two-handle faucet is connected to a cold water supply and a hot water supply for separately controlling the inflow of cold water and the inflow of hot water and then controlling the amount of water to flow out via the faucet spout and the water temperature. It has the advantages of convenient operation and stable water temperature, so the two-handle faucet is widely used.

The valve core of the existing two-handle faucet not only needs to be hermetically connected to the water supply but also needs to be hermetically connected to a tee connector. The structure of the valve core assembly of the existing two-handle faucet is complicated, which causes inconvenience in production and assembly.

The inlet hose of the existing two-handle faucet is directly connected to the valve body. The valve body is used for the passing of water and product assembly. It is necessary to use materials with good strength and performance to ensure the environmental protection and safety of the water, and the cost is high and the stable performance is not guaranteed.

Accordingly, the inventor of the present invention has devoted himself based on his many years of practical experiences to solve these problems.

SUMMARY OF THE INVENTION

The primary object of the present invention is to provide a two-handle faucet that can be assembled easily and has the characteristics of low cost and stable product performance.

In order to achieve the above object, the present invention adopts the following solutions.

A two-handle faucet comprises a faucet body, a faucet housing, and a faucet base. The faucet base is detachably mounted to a bottom of the faucet housing. The faucet body is installed in the faucet housing. The faucet body includes two valve core assemblies, a tee connector, a water outlet pipe, and two water inlet pipes. The water inlet pipes are insertedly connected to the faucet base. The water outlet pipe is hermetically connected to the tee connector. The water inlet pipes are connected to the tee connector through the two valve core assemblies.

Preferably, each valve core assembly includes a valve core seat and a valve core accommodated in the valve core seat. The faucet base is integrally formed of a metal material. The valve core seat is made of a plastic material. The valve core seats of the two valve core assemblies are hermetically connected to the water inlet pipes, respectively. The tee connector is hermetically connected to the valve core seats of the two valve core assemblies.

Preferably, the valve core seat has a water inlet connector and a water outlet connector. The water inlet connectors of the valve core seats of the two valve core assemblies are hermetically connected to the water inlet pipes, respectively. A water outlet end of the tee connector is hermetically connected to the water outlet pipe. The water outlet connector and either water inlet end of the tee connector are connected through a locking block to be mated with a locking portion. The locking block is detachably, rotatably locked in the locking portion.

Preferably, the locking portion includes a horizontal perforation and a vertical perforation communicating with the horizontal perforation.

Preferably, the locking block is arranged on an outer side wall of the water outlet connector. An inner wall surface of the water inlet end of the tee connector is recessed with a slide groove. The horizontal perforation and the vertical perforation are arranged on a wall of the water inlet end of the tee connector. The locking block is slid into the horizontal perforation from the slide groove and locked in the vertical perforation.

Alternatively, the locking block is arranged on an outer side wall of the tee connector. An inner wall surface of the water outlet connector is recessed with a slide groove. The horizontal perforation and the vertical perforation are arranged on a wall of the water outlet connector. The locking block is slid into the horizontal perforation from the slide groove and locked in the vertical perforation.

Preferably, each valve core assembly further includes a valve core locking nut. The valve core has an adjustment shaft for adjusting the amount of water. The adjustment shaft of the valve core extends out of the valve core locking nut. The valve core locking nut is configured to lock the valve core in the valve core seat. The valve core is hermetically connected to the valve core seat.

Preferably, the faucet housing has two handles. The adjustment shafts of the valve cores of the two valve core assemblies are connected to the handles, respectively.

Preferably, sealing rings are provided at the junction of the water outlet pipe and the water outlet end of the tee connector, the junction of each water inlet pipe and the water inlet connector, the junction of the valve core and the valve core seat and the junction of the water outlet pipe and the faucet housing, respectively.

Preferably, a bottom of the faucet base is integrally formed with two threaded pipes. The water inlet pipes are inserted through the threaded pipes, respectively.

Preferably, a top of the faucet base is integrally formed with two split threaded connectors. The threaded connectors communicate with the corresponding threaded pipes, respectively. The water inlet pipes are inserted into the corresponding threaded connectors, respectively. The water inlet connectors of the two valve core assemblies are accommodated in the corresponding threaded connectors, respectively.

Preferably, an outer wall of the water inlet connector is formed with an engaging groove, and the engaging groove is engaged with an engaging member.

Preferably, a bottom of each water inlet pipe is provided with a screw joint.

Preferably, a pressing plate is provided between the water outlet end of the tee connector and an inner wall of the faucet housing, and the pressing plate is clamped outside the water outlet pipe.

After adopting the above technical solutions, with the structural design of the tee connector and the valve core assemblies, the water inlet pipes of the present invention are connected to the tee connector through the valve core assemblies. The valve core assemblies are responsible for the passing of water. The faucet base is only used for supporting the faucet, and the water won't pass through the faucet base. In this way, the faucet provided by the present invention is safe for use and has sufficient strength, so that the product performance is stable and the cost can be reduced.

Furthermore, the tee connector of the present invention is hermetically connected to the valve core seat, and the water inlet pipe is hermetically connected to the valve core seat. The valve core seat is responsible for the passing of water. The valve core seat may be made of an environmentally friendly and healthy plastic material. The faucet base may be made of a cheap but strong metal material. In this way, the faucet provided by the present invention is safe for use and has sufficient strength, so that the product performance is stable, and the cost can be reduced.

When in installation, the valve core assembly is first aligned with the water inlet end of the tee connector, and the locking block of the water outlet connector of the valve core assembly is slid along the slide groove into the water inlet end of the tee connector. Then, the locking block enters the horizontal perforation from the slide groove, and the valve core assembly is rotated for the locking block to enter the junction of the horizontal perforation and the vertical perforation, and the valve core assembly is pulled outward, so that the locking block is locked in the vertical perforation. After the two valve core assemblies and the tee connector are installed, the faucet housing is installed outside the faucet body. The faucet base is installed to the bottom of the faucet housing. Since the distance between the positions where the two first water inlet pipes pass through the faucet base does not change, the first water inlet pipes are aligned with and connected to the water inlet connectors of the two valve core assemblies in a sealing manner. Therefore, the distance between the water inlet connectors of the two valve core assemblies remains unchanged, so that the locking block after installation will not be disengaged from the vertical perforation to the horizontal perforation. The installation of the faucet of the present invention is firm, easy and fast.

DETAILED DESCRIPTION OF THE PREFERRED EMBODIMENTS

Figure 1:
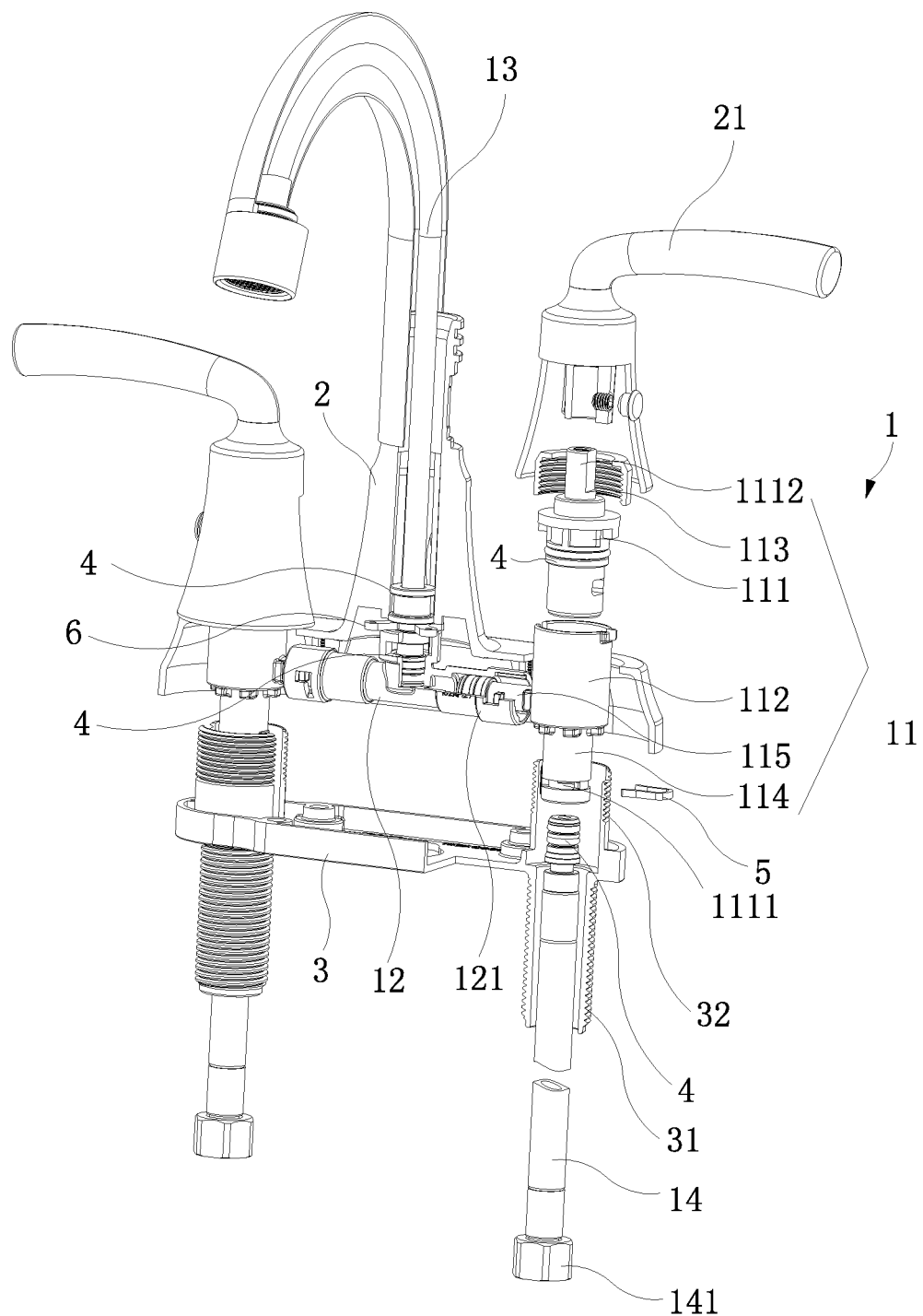
FIG. 1 is a schematic view according to a first embodiment of the present invention.

In order to achieve the above-mentioned objectives and effects, the technical means and structure adopted by the present invention are described in detail below to illustrate the features and functions of the preferred embodiments of the present invention for a complete understanding of the present invention.

Referring to FIG. 1 through FIG. 5, the present invention discloses a two-handle faucet that can be assembled easily. The two-handle faucet comprises a faucet body 1, a faucet housing 2, and a faucet base 3. The faucet base 3 is detachably mounted to the bottom of the faucet housing 2. The faucet body 1 is installed in the faucet housing 2. The faucet body 1 includes two valve core assemblies 11, a tee connector 12, a water outlet pipe 13, and two water inlet pipes 14. The water inlet pipes 14 are insertedly connected to the faucet base 3. The water outlet pipe 13 is hermetically connected to the tee connector 12.

Each valve core assembly 11 includes a valve core seat 112 and a valve core 111 accommodated in the valve core seat 112. The faucet base 3 is integrally formed of a metal material. The valve core seat 112 is made of a plastic material. The valve core seat 112 is hermetically connected to a corresponding one of the water inlet pipes 14. The tee connector 12 is hermetically connected to the valve core seat 112. The water inlet pipes 14 are connected to the tee connector 12 through the two valve core assemblies 11.

Therefore, the present invention uses the valve core seat 112 to be responsible for the passing of water. The valve core seat 112 may be made of an environmentally friendly and healthy plastic material. The faucet base 3 is only used for supporting the faucet, and the water won't pass through the faucet base 3, so the faucet base 3 may be made of a cheap but strong metal material. In this way, the faucet provided by the present invention is safe for use and has sufficient strength, so that the product performance is stable, and the cost can be reduced.

Each valve core seat 112 has a water inlet connector 114 and a water outlet connector 115. The water inlet connector 114 is hermetically connected to the corresponding water inlet pipe 14. A water outlet end 122 of the tee connector 12 is hermetically connected to the water outlet pipe 13. The water outlet connector 115 and either water inlet end 121 of the tee connector 12 are connected through a locking block 1121 to be mated with a locking portion 121'. The locking block 1121 is detachably, rotatably locked in the locking portion 121'.

In this embodiment, the locking portion 121' includes a horizontal perforation 1212 and a vertical perforation 1213 communicating with the horizontal perforation 1212, but not limited thereto.

Figure 2:
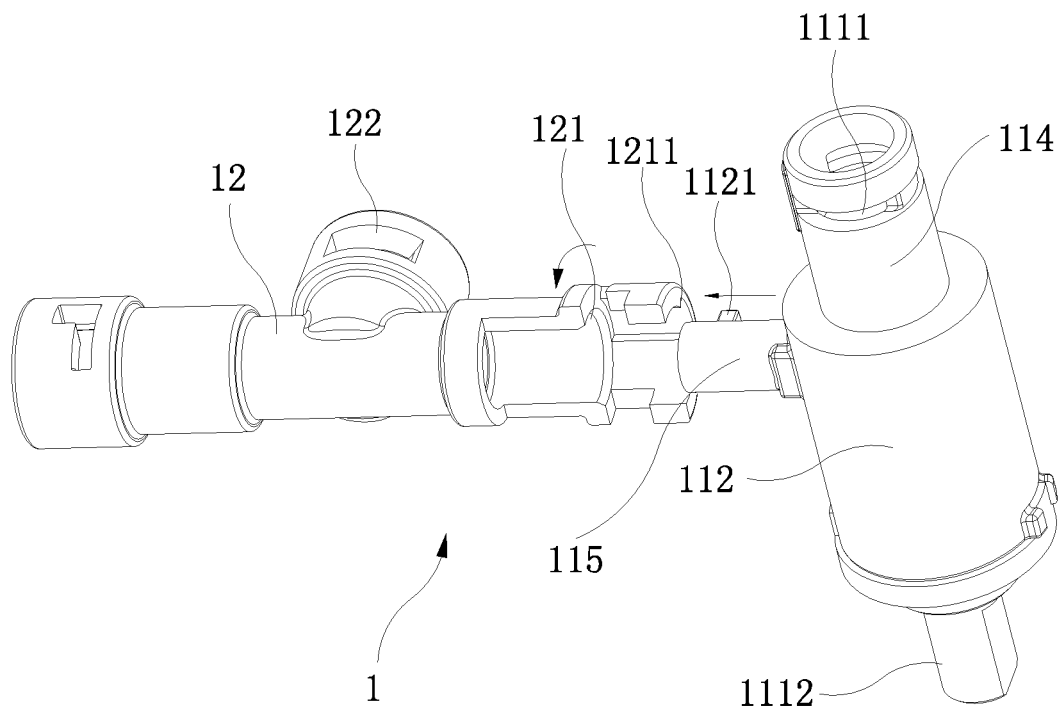
FIG. 2 is a first schematic view illustrating the assembly of the tee connector and the valve core assembly according to the first embodiment of the present invention.
Figure 3:
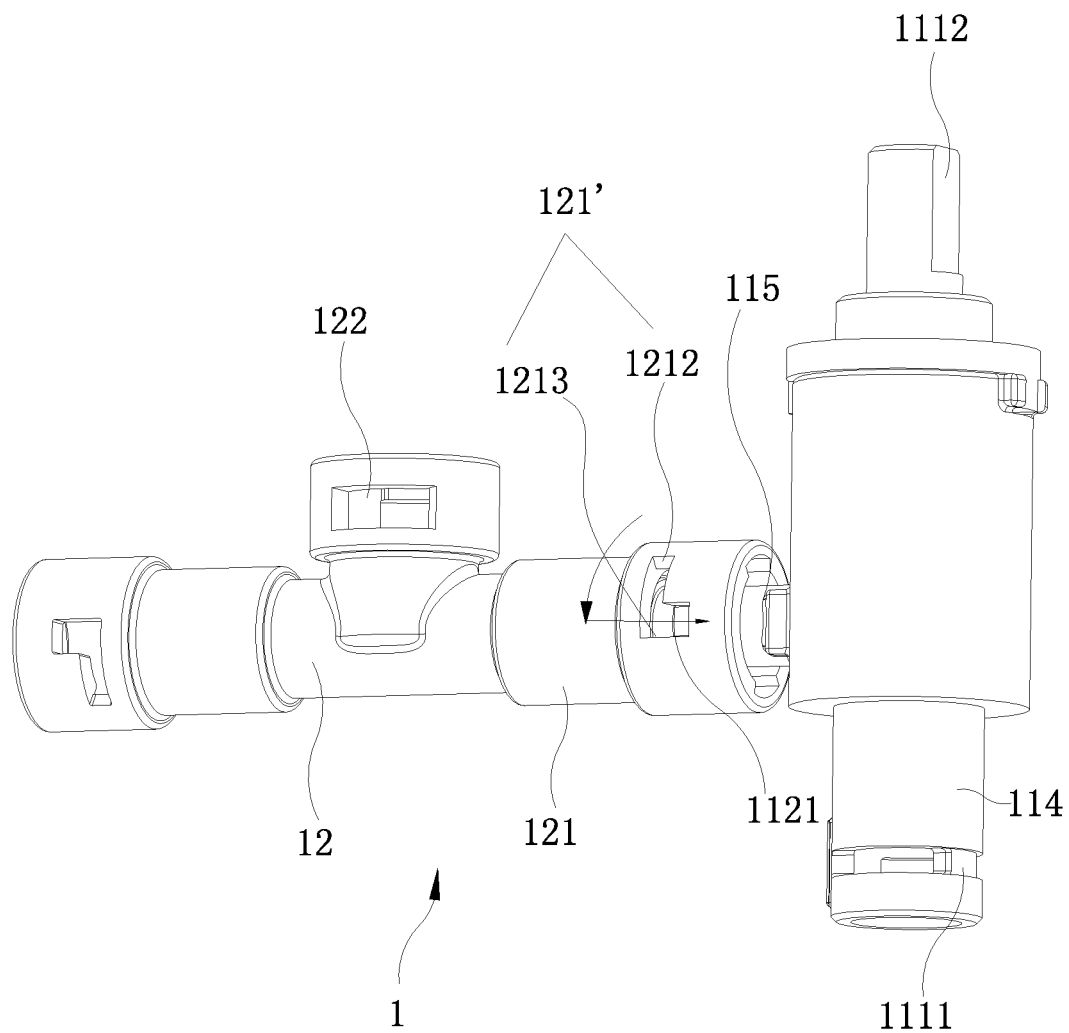
FIG. 3 is a second schematic view illustrating the assembly of the tee connector and the valve core assembly according to the first embodiment of the present invention.

In the first embodiment, as shown in FIG. 2 and FIG. 3, the outer side wall of the water outlet connector 115 is provided with at least one locking block 1121. The water outlet end 122 of the tee connector 12 is hermetically connected to the water outlet pipe 13. The inner wall surface of the water inlet end 121 of the tee connector 12 is recessed with a slide groove 1211. The wall of the water inlet end 121 of the tee connector 12 is formed with a horizontal perforation 1212 and a vertical perforation 1213 communicating with the horizontal perforation 1212. The locking block 1121 is slid into the horizontal perforation 1212 from the slide groove 1211 and then locked in the vertical perforation 1213. The end of the water outlet connector 115 of the valve core assembly 11 is hermetically connected to the corresponding water inlet end 121 of the tee connector 12.

When in installation, the valve core assembly 11 is first aligned with the water inlet end 121 of the tee connector 12, and the locking block 1121 of the water outlet connector 115 of the valve core assembly 11 is slid along the slide groove 1211 into the water inlet end 121 of the tee connector 12. Then, the locking block 1121 enters the horizontal perforation 1212 from the slide groove 1211, and the valve core assembly 11 is rotated for the locking block 1121 to enter the junction of the horizontal perforation 1212 and the vertical perforation 1213, and the valve core assembly 11 is pulled outward, so that the locking block 1121 is locked in the vertical perforation 1213. After the two valve core assemblies 11 and the tee connector 12 are installed, the faucet housing 2 is installed outside the faucet body 1. The faucet base 3 is installed to the bottom of the faucet housing 2. Since the distance between the positions where the two first water inlet pipes 14 pass through the faucet base 3 does not change, the first water inlet pipes 14 are aligned with and connected to the water inlet connectors 114 of the two valve core assemblies 11 in a sealing manner. Therefore, the distance between the water inlet connectors 114 of the two valve core assemblies 11 remains unchanged, so that the locking block 1121 after installation will not be disengaged from the vertical perforation 1213 to the horizontal perforation 1212. The installation of the faucet of the present invention is firm, easy and fast.

The width of the locking block 1121 may be slightly less than the width of the vertical perforation 1213. Therefore, when the locking block 1121 is completely locked into the vertical through hole 1213, there is a space for fine-tuning, so that there is a space for adjustment of structural tolerances. The locking block 1121 cannot be rotated after being locked, and the direction can be fixed.

The valve core assembly 11 further includes a valve core locking nut 113. The valve core 111 has an adjustment shaft 1112 for adjusting the amount of water. The adjustment shaft 1112 of the valve core 111 extends out of the valve core locking nut 113. The valve core locking nut 113 is configured to lock the valve core 111 in the valve core seat 112. The valve core 111 is hermetically connected to the valve core seat 112. Both the water inlet connector 114 and the water outlet connector 115 are arranged on the valve core seat 112, so that the water inlet pipe 14 is hermetically connected to the water inlet connector 114 of the valve core seat 112 to allow water to flow in the valve core seat 112 alone.

In order to facilitate the adjustment of the water temperature, the faucet housing 2 has two handles 21. The adjustment shafts 1112 of the valve cores 111 of the two valve core assemblies 11 are connected to the handles 22, respectively.

In order to improve the overall tightness of the faucet provided by the present invention, sealing rings 4 are provided at the junction of the water outlet pipe 13 and the water outlet end 122 of the tee connector 12, the junction of the water inlet pipe 14 and the water inlet connector 114, the junction of the valve core 11 and the valve core seat 112 and the junction of the water outlet pipe 13 and the faucet housing 2, respectively.

Further, the bottom of the faucet base 3 may be integrally formed with two threaded pipes 31. The water inlet pipes 14 are inserted through the threaded pipes 31, respectively. The threaded pipes 31 may be made of a metal or plastic material, so that the user can choose a desired one according to his/her needs.

Furthermore, the top of the faucet base 3 may be integrally formed with two split threaded connectors 32. The split threaded connector 32 is formed with an axial opening, giving way to the water outlet connector 115, that is, the water outlet connector 115 extends out from the opening. The threaded connectors 32 communicate with the corresponding threaded pipes 31, respectively. The water inlet pipes 14 are inserted into the corresponding threaded connectors 32, respectively. The water inlet connectors 114 of the two valve core assemblies 11 are accommodated in the corresponding threaded connectors 32, respectively. As the threaded connector 32 is screwed into the faucet housing 2, the threaded connector 32 can be tightly fitted with the faucet housing 2.

The outer wall of the water inlet connector 114 may be formed with an engaging groove 1111. The engaging groove 1111 is engaged with an engaging member 5, so that the water inlet connector 114 can be tightly fitted with the threaded connector 32.

In order to facilitate the connection and use of the faucet provided by the present invention, the bottom of the water inlet pipe 14 may be provided with a screw joint 141.

Further, a pressing plate 6 is provided between the water outlet end 122 of the tee connector 12 and the inner wall of the faucet housing 2. The pressing plate 6 is clamped outside the water outlet pipe 13, thereby improving the overall connection strength and tightness of the present invention. When high-pressure water passes, water leakage can be avoided.

In addition, the faucet housing 2 and the faucet base 3 can be made of cheap and strong materials because the water won't pass through the faucet housing 2 and the faucet base 3. The faucet housing 2 plays a role of decoration and strength support. The faucet provided by the present invention will not be pulled off and rotated after being installed.

Figure 4:
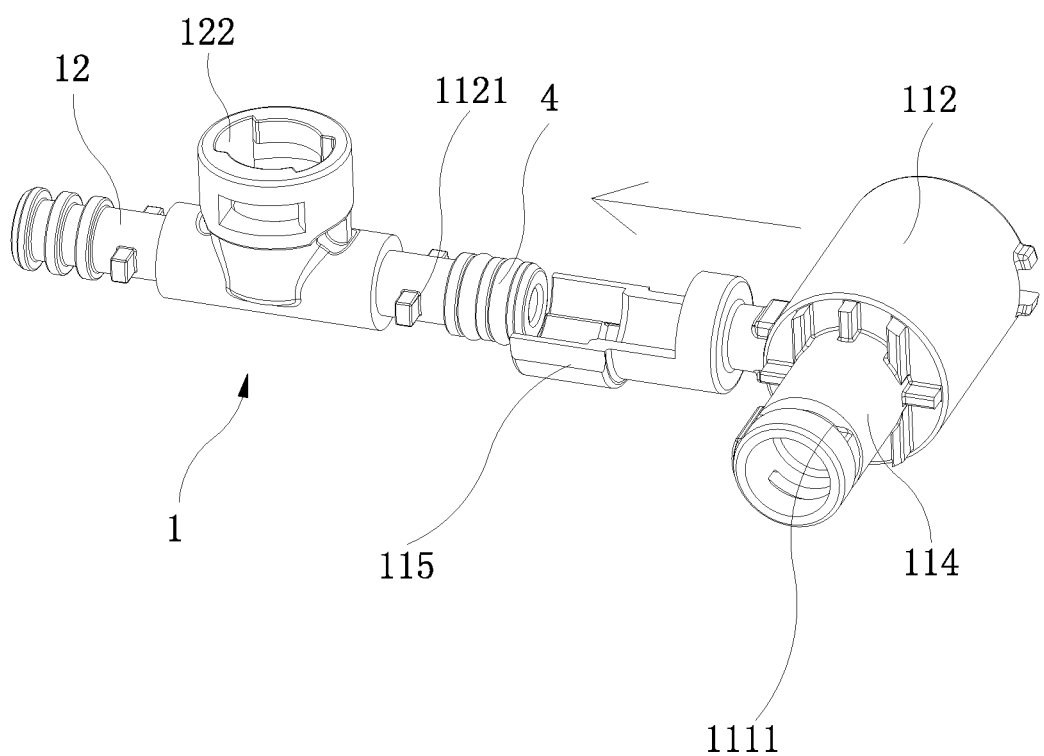
FIG. 4 is a first schematic view illustrating the assembly of the tee connector and the valve core assembly according to a second embodiment of the present invention.
Figure 5:
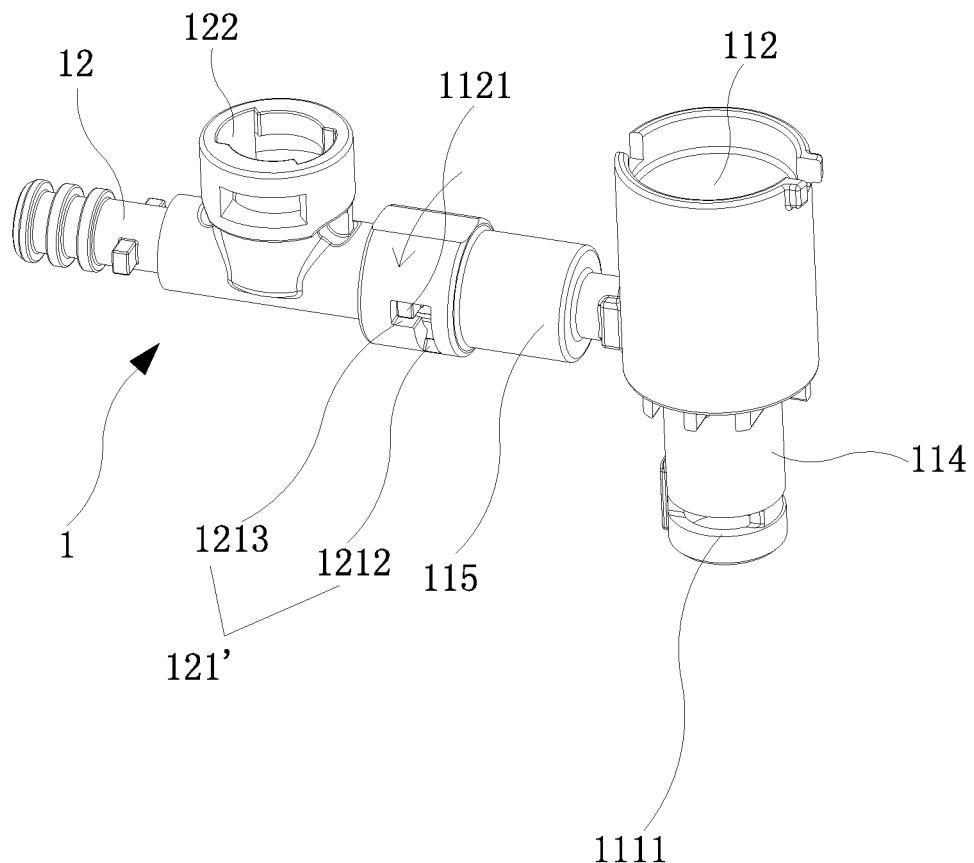
FIG. 5 is a second schematic view illustrating the assembly of the tee connector and the valve core assembly according to the second embodiment of the present invention.

Please refer to FIG. 2 through FIG. 5. FIG. 4 and FIG. 5 illustrate a second embodiment of the present invention. The difference between the second embodiment and the first embodiment is described below. In the second embodiment, the locking block 1121 is arranged on the outer side wall of the tee connector 12. The slide groove 1211 is arranged on the inner wall surface of the water outlet connector 115. The horizontal perforation 1212 and the vertical perforation 1213 are arranged on the wall of the water outlet connector 115.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A two-handle faucet, comprising a faucet body, a faucet housing and a faucet base, the faucet base being detachably mounted to a bottom of the faucet housing, the faucet body being installed in the faucet housing, the faucet body including two valve core assemblies, a tee connector, a water outlet pipe and two water inlet pipes, the water inlet pipes being insertedly connected to the faucet base; the water outlet pipe being hermetically connected to the tee connector, the water inlet pipes being connected to the tee connector through the two valve core assemblies, wherein a bottom of the faucet base is integrally formed with two threaded pipes, and wherein a top of the faucet base is integrally formed with two split threaded connectors, the threaded connectors communicate with the corresponding threaded pipes respectively, the water inlet pipes are inserted into the corresponding threaded connectors respectively, and the threaded connectors are screwed into the faucet housing.

2. The two-handle faucet as claimed in claim 1, wherein each of the valve core assemblies includes a valve core seat and a valve core accommodated in the valve core seat, the faucet base is integrally formed of a metal material, each of the valve core seats are made of a plastic material, each of the valve core seats is hermetically connected to a respective one of the water inlet pipes, and the tee connector is hermetically connected to each of the valve core seats.

3. The two-handle faucet as claimed in claim 2, wherein each of the valve core seats has a water inlet connector and a water outlet connector, each of the water inlet connector is hermetically connected to a respective one of the water inlet pipes, a water outlet end of the tee connector is hermetically connected to the water outlet pipe, the water outlet connector and either water inlet end of the tee connector are connected through a locking block to be mated with a locking portion, and the locking block is detachably, rotatably locked in the locking portion.

4. The two-handle faucet as claimed in claim 3, wherein the locking portion includes a horizontal perforation and a vertical perforation communicating with the horizontal perforation.

5. The two-handle faucet as claimed in claim 4, wherein the locking block is arranged on an outer side wall of the water outlet connector, an inner wall surface of the water inlet end of the tee connector is recessed with a slide groove, the horizontal perforation and the vertical perforation are arranged on a wall of the water inlet end of the tee connector, and the locking block is slid into the horizontal perforation from the slide groove and locked in the vertical perforation.

6. The two-handle faucet as claimed in claim 4, wherein the locking block is arranged on an outer side wall of the tee connector, an inner wall surface of the water outlet connector is recessed with a slide groove, the horizontal perforation and the vertical perforation are arranged on a wall of the water outlet connector, and the locking block is slid into the horizontal perforation from the slide groove and locked in the vertical perforation.

7. The two-handle faucet as claimed in claim 3, wherein each of the water inlet connectors is accommodated in a respective one of the threaded connectors.

8. The two-handle faucet as claimed in claim 7, wherein an outer wall of each of the water inlet connectors is formed with an engaging groove, and each of the engaging grooves is engaged with an engaging member.

9. The two-handle faucet as claimed in claim 2, wherein each of the valve core assemblies further includes a valve core locking nut, each of the valve cores has an adjustment shaft for adjusting the amount of water, each of the adjustment shafts extends out of a respective one of the valve core locking nuts, each of the valve core locking nuts is configured to lock a respective one of the valve cores in a respective one of the valve core seats, and each of the valve cores is hermetically connected to a respective one of the valve core seats.

10. The two-handle faucet as claimed in claim 9, wherein the faucet housing has two handles, and each of the adjustment shafts is connected to a respective one of the handles.

11. The two-handle faucet as claimed in claim 9, wherein sealing rings are provided at a junction of the water outlet pipe and the water outlet end of the tee connector, a respective junction of each of the water inlet pipes and the water inlet connector, a respective junction of each of the valve cores and each of the valve core seats, and a junction of the water outlet pipe and the faucet housing, respectively.

12. The two-handle faucet as claimed in claim 2, wherein a bottom of each of the water inlet pipes is provided with a screw joint.

13. The two-handle faucet as claimed in claim 2, wherein a pressing plate is provided between the water outlet end of the tee connector and an inner wall of the faucet housing, and the pressing plate is clamped outside the water outlet pipe.

\* \* \* \* \*